Sept. 17, 1935.   J. C. MARTIN, JR   2,014,480
PLUG VALVE
Filed Aug. 29, 1931
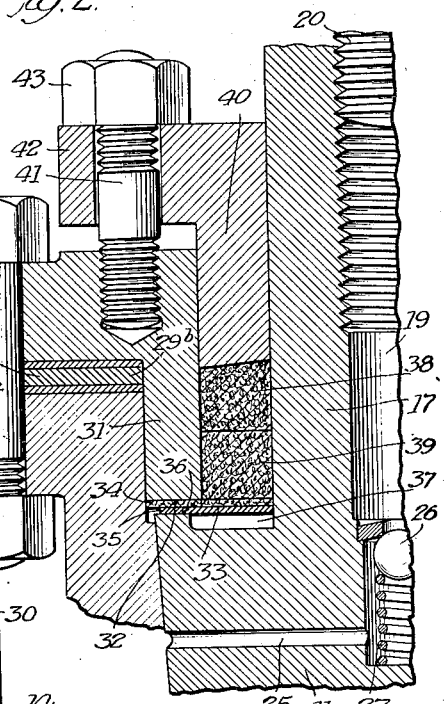
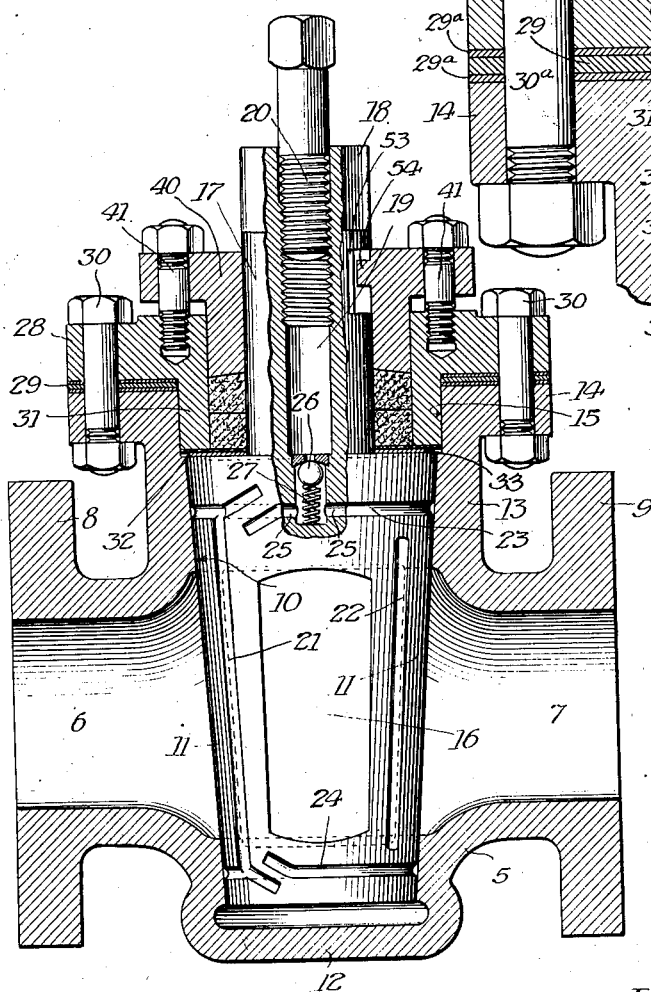
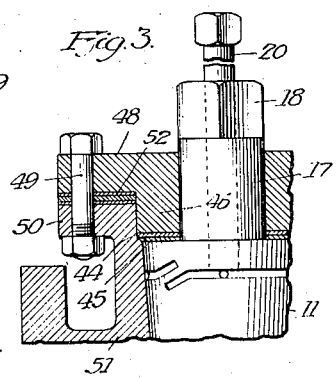
Inventor
Jesse C. Martin Jr.

Patented Sept. 17, 1935

2,014,480

UNITED STATES PATENT OFFICE 2,014,480

PLUG VALVE

Jesse C. Martin, Jr., Los Angeles, Calif., assignor to Walworth Patents, Inc., Boston, Mass., a corporation of Massachusetts Application August 29, 1931, Serial No. 560,212

6 Claims. (Cl. 251—103)

This invention relates in general to valves, and particularly to pipe line valves generally known as plug cocks or plug valves, and is particularly characterized by the provision of an improved arrangement of the valve retaining and packing means.

While, for example, the valve is disclosed as incorporating lubricating means, it will be understood that the invention is of more or less general application to plug valves and the like and finds a wide field of utility irrespective of the lubricating features thereof.

The principal objects and advantages of this invention reside in the provision generally of an improved form of plug valve incorporating, in general, two novel features, that is to say, an improved form of plug valve wherein the plug is maintained in its seat by an improved gasket structure and retaining means therefor; the provision of an improved form of plug valve wherein improved means is provided for retaining the plug in its seat by a double compressible joint and gasket structure; the provision of an improved form of plug valve wherein the area of contact between the plug valve member and the retaining elements therefor is reduced in so far as practicable so as to reduce the friction between the gasket and/or packing and the valve member, thereby permitting a freedom of movement of the plug in its seat not ordinarily obtainable, as well as preserving the integrity of the movable compressible joint as a seal against fluid leakage from the valve.

Further objects and advantages of this invention reside in the provision of an improved plug valve structure wherein substantially all torque strain on the flange gasket employed in forming the joint between the valve retaining member and the casing is eliminated, thereby preventing twisting or other distortion of the flange gasket and eliminating the necessity for constant taking up by reason of the heavy end thrust placed against it on valves of the high pressure type and when the valve member is rotated under pressure from open to closed position, or vice versa.

This invention is further characterized by the provision of an improved compressible gasket joint construction for retaining the plug in the plug seat independently of any axial strain or twisting movement thereagainst, such, for example, which occurs when the gasket is disposed across one end of the plug and held on the outer rim of the valve body; the provision of an improved sealing gasket construction for the body or casing of a plug valve; the provision of an improved composite sealing gasket which is retained in its position by engagement between the plug valve member and a retaining element for the latter; and the provision, in combination with an improved arrangement of sealing gasket, of an improved form of packing ring for engagement with the plug retaining element, sealing gasket and projecting portion of the valve member.

The foregoing objects and advantages, together with such other objects and advantages as may appear as this description proceeds, are attained in the structural embodiments of the invention illustrated in the accompanying drawing, in which:

Figure 1 is a sectional view of a plug valve incorporating the improvements of this invention, portions thereof being shown in elevation;

Figure 2 is a fragmentary enlarged sectional view of the form of the invention shown in Figure 1; and Figure 3 is a fragmentary sectional view of an alternative form of the invention.

Referring now more particularly to the drawing, and first to the form of the invention shown in Figures 1 and 2, a plug valve body or casing is shown at 5 provided with transverse passageways 6 and 7 having external flanges 8 and 9 for connection to a pipe line or the like.

Transversely of the passageways 6 and 7 there is provided a tapered valve seat 10 in which a plug member 11, also tapered, is adapted to seat, the bottom or lower end of the seat, as viewed in Figure 1, being permanently closed by an end wall 12, the opposite end of the seat being open and the casing 5 being extended, as at 13, and formed at that end with an annular flange 14.

It will be observed that the larger end of the valve seat terminates in a substantially cylindrical portion 15 and that this is of slightly greater diameter than that of the adjacent larger end of the plug member. The plug member is provided with a transverse opening 16 which is adapted to control the flow of fluid through the passageways 6 and 7, the valve being shown in the drawing as in closed position.

The plug valve member 11 is provided with a stem or operating portion 17 which is adapted to project beyond the casing and its closure and is provided with a wrench square portion 18.

Within the stem 17 there may be provided, if the valve is to be of the lubricated type, a chamber 19 for containing lubricant in which a compressor screw 20 is threaded, said chamber 19 communicating with longitudinal grooves 21, 22 and transverse grooves 23 and 24 provided in the surface of contact between the valve and its seat, by the provision of ports 25 in the plug valve member, counter-flow from the grooves into the chamber 19 being arrested by the provision of a check valve 26 held on its seat by a spring 27.

For retaining the valve in its seat and/or forming a retaining means for the sealing gasket structure, I provide a valve retaining flange plate 28, said flange plate being adapted to engage a composite resilient packing gasket 29 interposed between one face of the plate 28 and the upper face of the flange 14 on the body of the valve, bolts 30 being provided to extend through the flange 14, plate 28 and said gasket 29 for retaining the plate 28 in operative position on the body and for forming a closure.

The plate 28 is provided with a cylindrical abutment portion 31 which is adapted to snugly engage the cylindrical portion 15 of the casing 5. Between the inner face 32 of the cylindrical flange 31 and the adjacent surface of the valve, I provide a sealing gasket 33 of composite construction, including a compressible joint disc 34 and a resilient metallic disc 35, said discs being bored to receive the stem 17 of the valve member and disposed so that the gasket or sealing portion 34, which is resilient in nature, is interposed between the disc 35 and the surface 32 of the flange 31, the metallic disc element 35 being in direct contact with the reduced upper area 36 of the adjacent face of the valve member. This surface is reduced in area by annularly recessing the larger end of the plug member as indicated at 37.

When the bolts 30 are tightened by turning up on the nuts 30a provided therefor, the plate 28 is drawn toward the flange 14 and thus the cylindrical abutting member 31 impinges on the packing gasket 34 and plate 35 compressing the two between the adjacent surfaces 32 and 36 of said abutment 31 and plug member 11, respectively. The resilient nature of the packing gasket 34 tends to hold the valve member in its seat and yet permits of a slight unseating of the valve member axially in response to lubricant pressure introduced into the grooves 21, 22, 23 and 24 upon turning down the compressor screw 20.

The gasket indicated generally by the numeral 29 is a composite flange gasket structure and consists of any suitable asbestos and rubber material of a compressible and resilient nature which will function to form a joint between the respective metallic surfaces of the plate 28 and flange 14. For example, the double compressible gaskets or discs shown at 29a may be of an asbestos material, and the intermediate gasket shown at 29b may be of rubber, all specially prepared to resist and best withstand the temperature of super-heated steam or the cracking of oil in practical operation without losing their resilient characteristics.

The metal disc 35 is preferably of slightly less outside diameter than that of the gasket 34 so that there will be a relatively small area of pressure contact between the abutment 31, gasket 34, disc 35 and plug member, thus materially reducing the friction and thus the resistance to turning of the plug member in its seat.

For valves of this type which are to be employed where relatively high pressures and/or temperatures are encountered in service, I provide a supplemental packing residing in a stuffing box formed by a space afforded between the inner cylindrical surface of the abutment member 31 and the valve stem 17. The bottom of this stuffing box is formed by the composite gasket including the discs 34 and 35, and a ring packing, composed of elements 38 and 39, is deposited in the stuffing box and rests upon the composite gasket 33.

A gland 40 is provided for compressing the packing rings 38 and 39 and, when thus compressed, the discs 34 and 35 are distorted into the recess 37. This does not materially increase the frictional resistance inasmuch as in this type of valve, where high pressures and temperatures are encountered, the disc 35 has a metal to metal contact in the recess 37 and thus facilitates turning of the plug valve member even where the necessary supplemental packing must be resorted to. The gland 40 is actuated against the rings 38 and 39 by the provision of stud bolts 41, 41 passing through a flange 42 in said gland element and having operating nuts 43 thereon.

The packing rings 38 and 39, as previously explained, are employed in valves of the character wherein the pressures are high, but in smaller sizes of valves employed under medium pressures the packing rings 38 and 39 may be eliminated and full dependence may be placed on the seal formed by the gaskets 34 and 35.

An alternative form of the invention shown in Figure 3 discloses the construction wherein the sealing gasket may be composed of the resilient disc of compressible material, designated 44, the friction reducing metallic disc 45 interposed between the retaining abutment member 46 carried by a plate 48 bolted at 49 to a flange 50 formed on the valve body 51. This form of the invention is substantially identical in its functioning with respect to the sealing gaskets 44 and 45 as that of the form of the invention shown in Figures 1 and 2 with respect to the gaskets 34 and 35. Similarly, the form of the invention shown in Figure 3 has the composite gasket 52 performing a function similar to the gasket 29 shown in Figures 1 and 2.

A function of the gaskets 34 and 35 and 44 and 45 in each instance is that there is no tendency for binding of the resilient gasket 44 in its seat, and the construction permits, if desired, of a general independent relative rotation of these gaskets when the plug is rotated so that they may act in a manner similar to the provision of a floating bushing in a bearing shaft, though, of course, possessing the additional function of forming a tightened seal against the escape of fluid from the pipe line and against the escape of lubricant up along the valve stem.

Any lubricant which is permitted to reach the space adjacent the outer peripheral edges of the gaskets 34, 35, 44 and 45 is prevented from leaking from the valve body by the provision of the sealing gaskets 52, as will be clearly observed from an inspection of the figures of the drawing.

One advantage of the form of the invention shown in Figures 1 and 2 is that, upon renewal or replacement of the packing rings 38 and 39, it is not necessary to shut off the valve against the flow of pressure in the pipe line, inasmuch as even under high pressures and temperatures, temporarily the gaskets 34 and 35 will form an adequate seal to permit of the removal of the gland 40 and re-packing or replacement of the rings 38 and 39.

In order to afford a limit stop for the valve, the stem may be provided with a circular recess 53 in which a stop lug 54 carried by the gland 40 is adapted to engage.

It will be understood from the foregoing that the novel construction of double compressible end joints, including the gaskets 34 and 35 and 29 on the one hand, as shown in Figures 1 and 2, and, on the other hand, the gaskets 44, 45 and 52 shown in Figure 3, serves to take the end thrust of the plug without torque strain when the plug is turned in its seat so that the integrity of the joint formation is preserved and the efficiency of the valve is maintained over much greater periods of time than is now obtainable in plug valves of this type. The provision of the gaskets 34 and 44 eliminates the necessity of incorporating spring elements in the valve structure for holding the valve on its seat, which springs in some constructions and for some purposes are objectionable, inasmuch as they are vulnerable to caustic or acid fluids conducted through the valve.

I desire to be understood that any form of lubricating and compressing means and any form of the lubricant grooves or channels included between the surfaces of contact of the valve and its seat may be employed for distributing the lubricant over the valve and its seat, the form shown in the drawing being purely exemplary, and that, as occasion requires to meet the service conditions obtaining, the present invention may be applied to analogous valve structures wherein no lubricant is employed, and will possess the same advantages as in a valve where lubricant is usually employed.

Having thus described my invention and illustrated its use, what I claim as new and desire to secure by Letters Patent is:

1. In a plug valve, in combination, a casing having a tapered seat terminating at its larger end in a recess, a tapered valve member for engaging said seat, transverse passageways in said casing and valve member for flow of fluid, an operating stem for said valve member extending beyond said casing and defining a shoulder on said valve member adjacent the bottom of said recess, a valve retaining flange on said casing having a portion extending within said recess and overlying said shoulder, and a packing supported by said shoulder out of engagement with said recess bottom and in engagement with the adjacent end of said overlying portion of said flange.

2. In a plug valve, in combination, a casing having a tapered seat terminating at its larger end in a cylindrical recess, a tapered valve member for engaging said seat, transverse passageways in said casing and valve member for flow of fluid, an operating stem for said valve member extending beyond said casing and defining a shoulder on said valve member adjacent the bottom of said recess, a valve retaining flange on said casing having a portion extending within said recess and overlying said shoulder, a packing supported by said shoulder out of engagement with said recess bottom and in engagement with the adjacent end of said overlying portion of said flange, and a supplemental packing engaging said stem and a part of said first mentioned packing.

3. In a plug valve, in combination, a casing having a tapered seat terminating at its larger end in a cylindrical recess, a tapered valve member for engaging said seat, transverse passageways in said casing and valve member for flow of fluid, an operating stem for said valve member extending beyond said casing and defining a shoulder on said valve member adjacent the bottom of said recess, a valve retaining flange on said casing having a portion extending within said recess and overlying said shoulder, a packing supported by said shoulder out of engagement with said recess bottom and in engagement with the adjacent end of said overlying portion of said flange, a supplemental packing engaging said stem and a part of said first mentioned packing and, a gland for compressing said supplemental packing, said gland and supplemental packing being removable and replaceable while the fluid pressure in the passageway is controlled by said valve member.

4. In a plug valve, in combination, a casing having a tapered seat terminating at its larger end in a cylindrical recess, a tapered valve member for engaging said seat, transverse passageways in said casing and valve member for flow of fluid, an operating stem for said valve member extending beyond said casing and defining a shoulder on said valve member adjacent the bottom of said recess, a valve retaining flange on said casing having a portion extending within said recess and overlying said shoulder, a packing supported by said shoulder out of engagement with said recess bottom and in engagement with the adjacent end of said overlying portion of said flange and a friction reducing element between said packing and the shoulder.

5. In a plug valve, in combination, a casing having a tapered seat, a tapered valve member for engaging said casing, transverse passageways in said seat and valve member for flow of fluid, an operating stem for said valve member extending beyond said casing and spaced therefrom to form a stuffing box, a valve retaining flange on said casing having a portion extending into said stuffing box and overlying said valve member, a compressible resilient packing gasket supported in engagement with said flange portion and out of engagement with the bottom of the stuffing box by the adjacent end of said valve member, a resilient friction reducing member being substantially coextensive with said gasket and mounted between said gasket and the adjacent portion of the valve member, said gasket and friction reducing member being adapted for rotation in the casing, and sealing packing gasket between said valve retaining flange and said casing.

6. In a plug valve, in combination, a casing having a tapered seat, a tapered valve member engaging said seat, transverse fluid passageways in said valve member and seat, an operating stem for said valve member extending beyond said casing, a valve retaining flange on said casing having a cylindrical portion overlying said valve member, a resilient compressible packing gasket interposed between said flange portion and the adjacent end of said valve member, and a resilient friction relieving disc between said gasket and said valve member, said disc being of less area than said gasket and being spaced from the casing, and the valve member having a reduced area of contact with said disc.

JESSE C. MARTIN, Jr.